Sept. 15, 1925.
R. W. YOUNG
TROLLEY POLE
Filed June 29, 1922
1,553,424
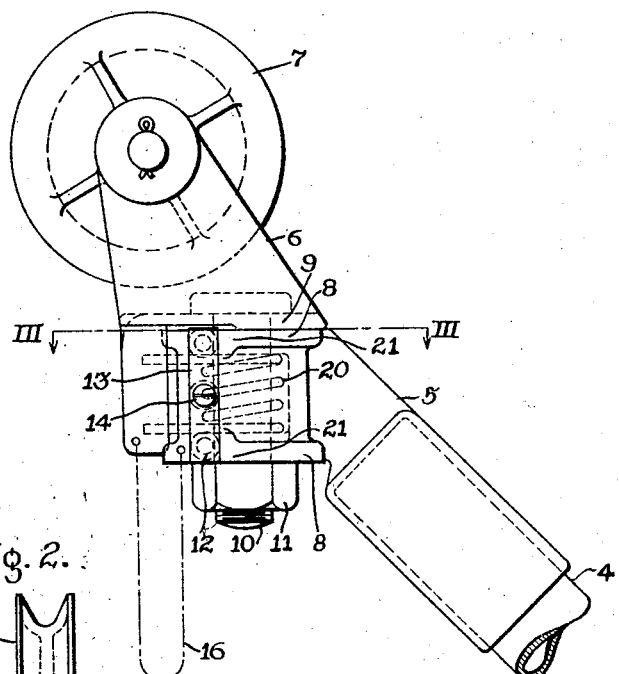
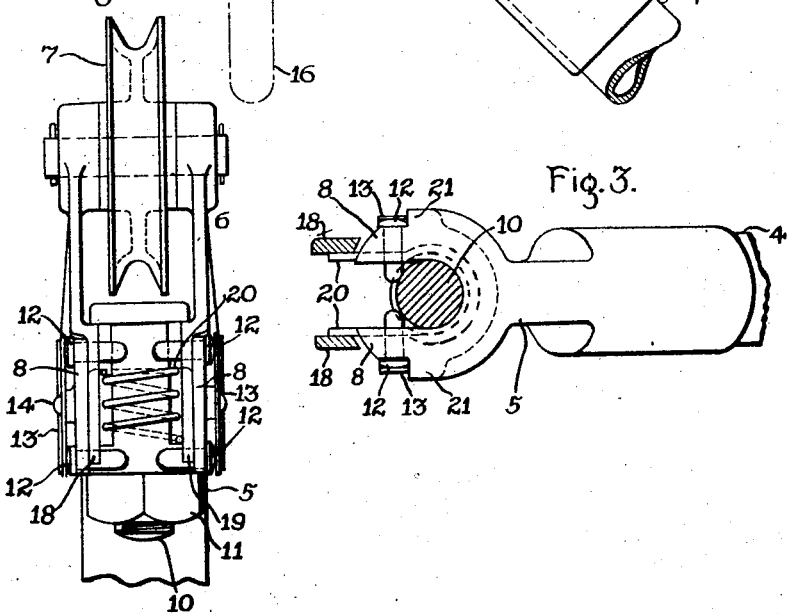
WITNESSES:
INVENTOR
Robert W. Young.
BY
ATTORNEY Patented Sept. 15, 1925.

1,553,424

UNITED STATES PATENT OFFICE.

ROBERT W. YOUNG, OF PITTSBURGH, PENNSYLVANIA, ASSIGNOR TO R. D. NUTTALL COMPANY, A CORPORATION OF PENNSYLVANIA.

TROLLEY POLE.

Application filed June 29, 1922. Serial No. 571,751.

*To all whom it may concern:*

Be known that I, ROBERT W. YOUNG, a citizen of the United States, and a resident of Pittsburgh, in the county of Allegheny and State of Pennsylvania, have invented a new and useful Improvement in Trolley Poles, of which the following is a specification.

My invention relates to trolley poles and particularly to means for detachably mounting a trolley harp and current collector thereupon.

My invention has for its object the provision of means whereby the current collector may be automatically detached from the pole upon the imposition thereupon of an abnormal stress, as when the current collector leaves the wire and is caught upon, or is thrown against, the overhead structure.

A further object of my invention is the provision of an improved form of mounting for a current collector and its harp whereby it may be quickly and conveniently inserted into position upon the trolley pole or removed therefrom.

As shown in the accompanying drawings,

Figure 1 is a view, in side elevation, of a portion of a trolley pole embodying my invention;

Fig. 2 is a view thereof in rear elevation, and

Fig. 3 is a view taken on the line III—III of Fig. 1.

A trolley pole 4 may be mounted upon the roof of a vehicle (not shown) in the usual manner and is provided with a pole head 5 that supports a swivel harp 6 which carries a trolley wheel 7. The pole head 5 has rearwardly-extending lugs 8, as indicated more clearly in Fig. 3.

The trolley harp 6 is provided with a base portion 9 through which a bolt 10 extends. The bolt 10 is of such length that it extends to a point below the lugs 8 of the pole head 5 and is provided with a nut 11 on its lower end. The bolt serves as a swivel member, or a pivot pin, for the harp 6.

In order that the bolt 10 may be detachably retained in position in the pole head 5, four pins 12 are provided. The pins 12 are slidable in slots provided in the lugs 8 and are normally biased inwardly by flat springs 13 that are secured to the pole head 5 by means of rivets 14. The inner ends of the bolts are rounded so that, when the vehicle is traveling in a forward direction, the bolt 10, upon the imposition of an abnormal thrust upon the harp or the trolley wheel, may force the pins 12 outwardly, against the compression of the springs 13, thus permitting the harp 6 to be freed from the pole.

A chain, or a rope, 16 is provided to avoid the necessity of the operator of the vehicle hunting the trolley wheel should it become detached at night, or in an unlighted place, such, for example, as in a coal mine. Ordinarily, the harp will not be held in the overhead structure after it is detached from the pole head, but the chain 16 may be of limited strength in order that it will break under excessive strain.

The harp 6 is provided with depending flanges 18 and 19 against which the ends of a centering spring 20 may abut to yieldingly hold the harp in proper alinement with the trolley pole 4.

The pole head 5 is provided with shoulders 21 against which the ends of the springs 13 may abut to prevent such springs from turning on the rivets 14.

It will be apparent that, instead of providing yielding retaining means at the rear of the bolt 10, a rigid structure of fragile material may be provided as a safety device but I prefer a yielding structure, inasmuch as it is thereby possible to readily detach and replace the trolley harp upon the pole without the necessity of employing nuts and bolts, or similar devices.

Various modifications in detail and arrangement may be made without departing from the spirit and scope of the invention, as defined in the accompanying claims.

I claim as my invention:

1. In combination, a trolley pole provided with a head having an opening extending rearwardly from its central portion, a yielding member for closing the opening and a trolley harp having a bearing portion extending into the said opening, in front of the yielding members.

2. The combination with a trolley pole provided with a head having a rearwardly disposed opening therein, a current collector supported upon a member extending into said opening, and yielding means for closing the opening.

3. The combination with a trolley pole provided with a head having an opening therein, a current collector having a portion extending into said opening, and spring-held stop members for holding the current collector in position in the opening.

4. The combination with a trolley pole and a current collector supported thereby, of means disposed across a portion of the said support for retaining the collector in position under normal stresses but of such strength that the collector will become dismounted upon the imposition of excessive stress thereupon.

5. The combination with a trolley pole provided with a pole head, of rearwardly-disposed extensions on the pole head, a trolley harp, a pin extending through the trolley harp and between the said extensions, a plurality of pins slidably supported in the extensions and disposed transversely of the first named pin, the said transverse pins being provided with rounded surfaces that are engaged by the other pin.

6. The combination with a trolley pole provided with a pole head, rearwardly-disposed extensions on the pole head, a trolley harp, a pin extending vertically through the trolley harp and between the said extensions, a plurality of pins slidably supported in the extensions and disposed transversely of the vertical pins, the said transverse pins being provided with rounded surfaces that are engaged by the vertical pins, and means for yieldingly maintaining the pins in locking position.

7. A device of the class described, comprising a trolley harp, a trolley pole head with reference to which the harp is rotatable and detachable means for connecting the harp and head, said detachable means including resilient devices, permitting of complete separation of the harp from a trolley pole.

In testimony whereof, I have hereunto subscribed my name this 19th day of June, 1922.

ROBERT W. YOUNG.